United States Patent
Egan

(10) Patent No.: US 6,334,275 B1
(45) Date of Patent: *Jan. 1, 2002

(54) SPORTS SURFACES AND METHODS OF PREPARING SPORTS SURFACES COMPRISING A TRANSPORTABLE TURF GRASS

(75) Inventor: Michael A. Egan, Savannah, GA (US)

(73) Assignee: Carco Development Company, Bakersfield, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/874,380

(22) Filed: Jun. 13, 1997

Related U.S. Application Data

(60) Continuation of application No. 08/509,172, filed on Jul. 31, 1995, now Pat. No. 5,651,213, which is a continuation-in-part of application No. 08/225,818, filed on Apr. 11, 1994, now abandoned, which is a division of application No. 07/926,663, filed on Aug. 7, 1992, now Pat. No. 5,301,466.

(51) Int. Cl.$^7$ ................................................ A01C 1/04
(52) U.S. Cl. ........................................ 47/56; 47/58.1
(58) Field of Search ..................... 47/56, 58.1, 1.01 F, 47/65.8

(56) References Cited

U.S. PATENT DOCUMENTS 3,890,739 A   6/1975   Blackburn .................... 47/57

(List continued on next page.)

FOREIGN PATENT DOCUMENTS

FR   2623054   5/1989
GB   2 138 690 A   10/1984

OTHER PUBLICATIONS

Soil The 1957 Yearbook of Agriculture, United States Department of Agriculture, pp. 766–767.

Soils, Norman Taylor, The Encyclopedia of Gardening, 1961, pp. 1121–1122.

Beard, "Turfgrass Science and Culture," Regents/Prentice Hall, Englewood Cliffs, New Jersey 07632, pp. 325–330, 349–352, 357–358, 523–529 (1973).

Beard, "Turf Management for Golf Courses," Macmullian Publishing Company, New York, pp. 104–115, 131, 172–173 (1982).

Beard, "Building a Golf Course," Turf Management for Golf Courses, The U.S.Golf Association, "Site Selection," pp. 36–38 and "Construction" p. 109. (1982).

Primary Examiner—Peter M. Poon
Assistant Examiner—Jeffrey L. Gellner
(74) Attorney, Agent, or Firm—McAndrews, Held & Malloy, Ltd.

(57) ABSTRACT

The present invention is directed to methods of preparing a sports surface comprising a transportable turf grass. A sand based root zone medium is employed for the production of the transportable turf grass on a barrier at a place other than the sports site. The present invention is also directed to the sports surfaces made by the methods of the present invention.

27 Claims, 1 Drawing Sheet

U.S. PATENT DOCUMENTS

| | | | |
|---|---|---|---|
| 3,890,910 A | 6/1975 | Angruner | 111/1 |
| 4,023,506 A | 5/1977 | Robey | 111/1 |
| 4,099,345 A | 7/1978 | Loads | 46/56 |
| 4,232,481 A | 11/1980 | Chamoulaud | 47/56 |
| 4,336,668 A | 6/1982 | Decker | 47/58 |
| 4,364,197 A | 12/1982 | Baron | 47/56 |
| 4,720,935 A | 1/1988 | Rogers et al. | 47/56 |
| 4,941,282 A | 7/1990 | Milstein | 47/58 |
| 4,986,026 A | 1/1991 | Decker | 47/56 |
| 5,033,231 A | 7/1991 | Sakate et al. | 47/56 |
| 5,177,898 A | 1/1993 | Decker | 47/56 |
| 5,189,833 A | 3/1993 | Clark | 47/56 |
| 5,199,215 A | 4/1993 | Lopez | 47/56 |
| 5,205,068 A | 4/1993 | Solomou | 47/56 |
| 5,224,290 A | 7/1993 | Molnar et al. | 47/56 |
| 5,226,255 A | 7/1993 | Robertson | 47/56 |
| 5,301,466 A * | 4/1994 | Egan | 47/58.1 |
| 5,481,827 A * | 1/1996 | Decker | 47/58.1 |
| 5,651,213 A * | 7/1997 | Egan | 47/56 |
| 5,765,304 A * | 6/1998 | Clark | 47/58.1 |

\* cited by examiner

SPORTS SURFACES AND METHODS OF PREPARING SPORTS SURFACES COMPRISING A TRANSPORTABLE TURF GRASS

This application is a continuation of Ser. No. 08/509,172, filed Jul. 31, 1995, now U.S. Pat. No. 5,651,213, which is a continuation-in-part of Ser. No. 08/225,818 filed Apr. 11, 1994 and, now abandoned, which is a division of Ser. No. 07/926,663, filed Aug. 7, 1992, now U.S. Pat. No. 5,301,466.

FIELD OF THE INVENTION

This invention relates to a method of producing turf grass in sod form. The invention is also directed to a composition for the use in the production of turf grass sod which is particularly well suited for use on sports surfaces such as stadium fields and golf courses. The invention also relates to a sod mat produced by the method of the present invention.

BACKGROUND OF THE INVENTION

The success of a sports turf grass sod (a mat of grass plants grown in surface soil and sliced horizontally into a thin layer for use in a place other than where grown) depends on the proper physical characteristics of the root zone medium (the medium in which the sod is initially grown) and the compatibility of that medium to the drainage bed and the root zone profiles (the area into which the root system of the sod will grow) underlying the sports field surface where the sod will be transplanted. Native topsoils used in sod production generally do not have the physical characteristics which make them compatible with the drainage beds and root zone profiles at the site of transplanting. Therefore, in most cases root zone medium must be provided to improve the compatibility of sod growing medium and the existing root zone profile. Typically, root zone medium is compounded from available sand, soil and fibrous organic amendments such as wood fiber. Because of extreme local variations in these materials, a high degree of expertise is necessary to determine which root zone medium blends contain the desired properties. Different lots of sand from the same pit may vary considerably in particle, size and shape. Native soils used in these blends also vary greatly in particle, size and shape, as well as in degree of aggregation, acidity, fertility, soluble salt, and organic matter content. Another variable in typical root zone medium blend is the fibrous organic amendment.

It has long been the desire of sports fields managers and golf course superintendents to have a source of sod in which the growth medium (root zone medium) matches or nearly matches and is thus compatible with the existing root zone profiles of the areas to be planted with sod.

Because of heavy compaction resulting from high traffic on sports fields and golf greens, said is used extensively in root zone medium mixes. The proportion of said to other materials in the mix will vary depending on what other amendments are to be used, the water percolation rate desired, and the ultimate use of the playing surface. Under most circumstances, if conventional sod is used on these playing surfaces, layering occurs. Layering refers to the formation of an interface between the fine soil particles of the root zone medium of the sod and the more coarse sand particles of the root zone profile of the transplant site. The layer formed by this process causes water flow to be interrupted when passing through the sod, into the root zone of the transplant site and the soil. As consistent percolation rates are very important in the maintenance of these surfaces and to the establishment of a suitable root system, great differences in particle size between the root zone medium of the sod and the root zone of the transplantation site which causes layering is obviously a great disadvantage.

The United States Golf Association (USGA) green section has established guidelines for sand particle sizes which, when used in golf greens, give the most consistent percolation rates, resists compaction by players and offers a good rot zone environment for grass plants. These guidelines often work extremely well for other sports field application but are occasionally modified to meet specific needs.

In U.S. Pat. No. 4,232,481, entitled "Carpet of Vegetable Matter" by Michel C. Chamoulaud, the production of sod or other vegetable matter is described. That patent teaches a compost layer made from wood bark which is crushed and gauged and spread onto a flat surface impermeable to plant roots. The compost mix is mixed with seeds before, during or after the application to the flat surface. The roots of the plants formed from the seed form a fabric embedded in a compost which facilitates the detachment of the sod from a flat surface.

In U.S. Pat. No. 4,941,282, by Gene Milstein entitled "Wildflower Sod Mat A Method of Propagation", the propagation of wildflower sod mats is described. The patent teaches a sod mat formed of sheets of porous synthetic material, a layer of planting medium and viable wildflower seeds which upon germination allows the root mass of the seeds to intermesh with the porous synthetic material thereby forming the sod mat. The patent teaches the planting medium composed of various materials such as a composition of 50% sphagnum moss 49% vermiculite or perlite, and 1% nutritive material, capable of sustaining plant growth.

The present invention is directed to a soil-less sand based root zone medium for the production of turf grass sod which has good percolation rates, good bulk density and resists compaction and whose composition may be altered so as to be compatible with the existing root zone profile of the transplant site. The present invention also relates to a method for production of turf grass sod using the soil-less sand based root zone medium. Finally the invention is also directed to a sod mat produced by the method of the present invention which is suitable for use on sports surfaces including stadium and golf courses.

SUMMARY OF THE INVENTION

It is an object of the invention to provide a soil-less, sand based root zone medium useful in the production of turf grasses in sod form and which is capable of being formulated so as to be compatible with the root zone soil profile of the site to which the sod will be transplanted and which has high consistent percolation rates and resists compaction, the root zone medium comprising:

(a) from about 60% by weight to about 100% by weight sand;

(b) from about 40% by weight to about 0% by weight organic amendment; and (c) an effective amount of fertilizer.

It is preferred that the grains of sand used in the present invention have a uniform size ranging from about 0.05 mm to about 1 mm.

It is also an object of the present invention to provide a sod mat comprising a mat of turf grass and a layer of soil-less sand based root zone medium produced by the method of the present invention.

DETAILED DESCRIPTION OF THE INVENTION

Figure 1:
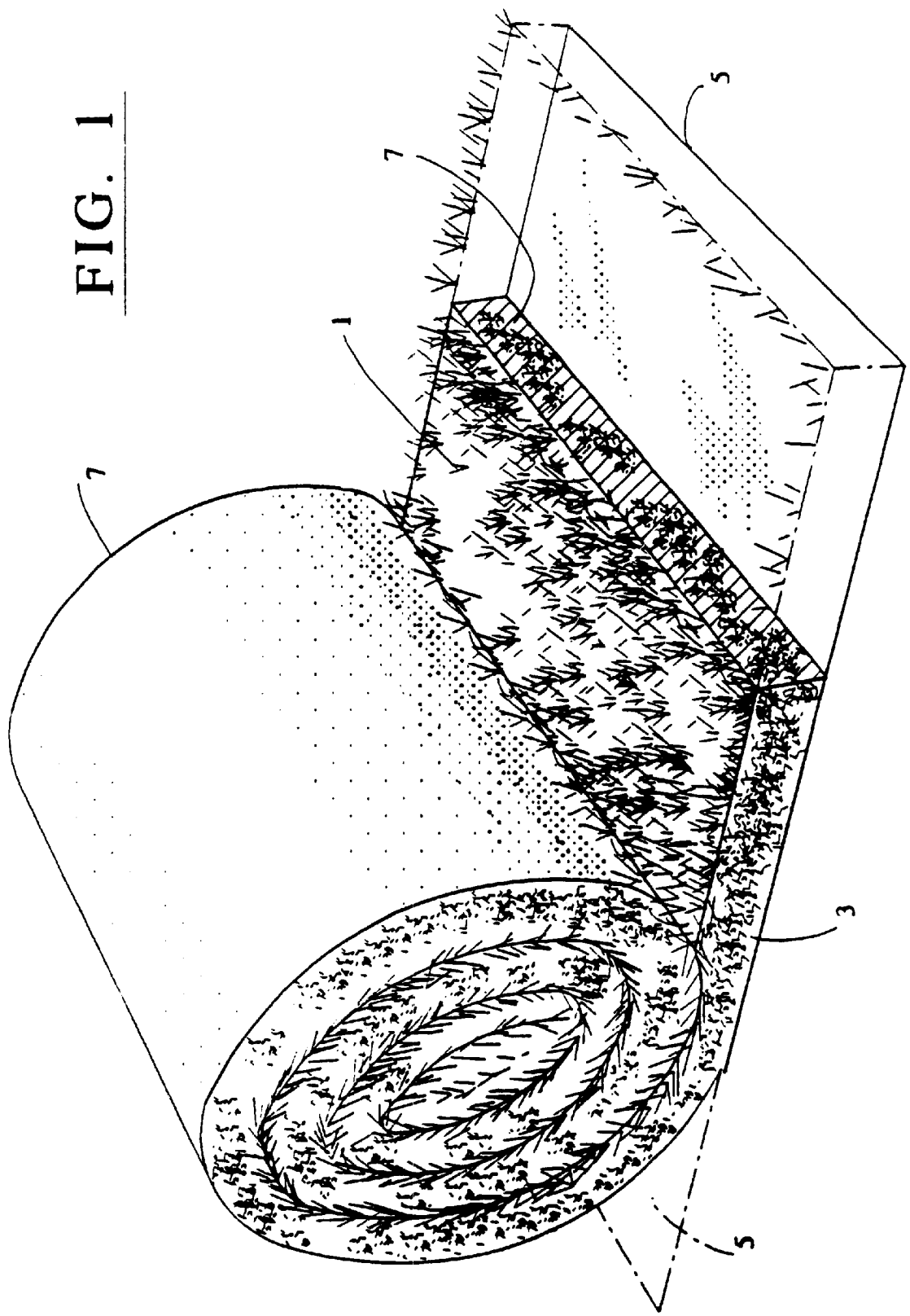
FIG. 1 illustrates a rolled sod mat including turf grass, root system, root zone medium and root impermeable layer.

The present invention relates to a soil-less sand based root zone medium useful in the production of sod and a method for the production of turf grass sod using the same soil-less sand based root zone medium. The present invention also relates to a sod mat comprising a mat of turf grass and a thin layer of the soil-less sand based root zone medium of the present invention (FIG. 1). Sod produced by the method of the present invention is highly resistant to compaction and meets USGA specifications for water infiltration rates (from 2 inches to about 10 inches per hour with an ideal rate of 4–6 inches per hour), bulk density (from about 1.2 gm/cc to about 1.6 gm/cc with an ideal bulk density from 1.25–1.45 gm/cc), porosity (total 40–55% with a non-capillary minimum of 15%) and water retention (12–25% by weight at a tension of 40 cm of water). Root zone media complying with these specifications promotes rapid growth of the turf grass and establishment of a dense root system.

The soil-less root zone medium of the present invention comprises from about 60% by weight to about 100% by weight sand, from about 40% by weight to about 0% by weight organic amendment and an effective amount of nutrient material such as fertilizers (typically less than 1% by weight).

The sand utilized in the soil-less root zone mixture of the present invention should be of uniform size ranging from about 0.05 to about 1 mm in size so as to allow consistent percolation rates in accordance with USGA standards and to provide resistance to compaction. The size of the sand grains used in the present invention may be selected so as to be comparable in size and therefore compatible with the root zone profile of the site to which the sod will be transplanted. The ability to select the appropriate sand size allows the user to customize the soil-less sand based root zone medium of the sod so as to be optimally compatible with the root zone profile of the transplant site. Soil-less sand based root zone medium containing this range of sand content and grain size minimizes layering problems which can arise when sod is laid on soil of the transplantation site.

The soil-less sand based root zone medium of the present invention also contains from about 40% by weight to about 0% by weight organic amendment. Organic amendments aid in the control of water percolation and infiltration rates, in retention of moisture, and may also provide nutritional value to the grass plants in the form of carbon, nitrogen phosphorus and minerals. Organic amendments useful in the present invention include but are not limited to, rice hull compost, milorganite, various peat mosses, fibrous plant material or fibrous vegetable matter.

The preferred organic amendment for use in the present invention is canadian sphagnum peat moss. The preferred percentage of organic and amendment in the present invention is from about 30% by weight to about 20% by weight of the soil-less sand based root zone medium. However, it is also recognized that the percentage of organic amendment may vary depending on the root zone composition on which the sod will be transplanted, and the specific uses of the turf being grown (e.g., golf course fairway, greens surfaces or other surfaces).

The composition of the present invention may also contain effective amounts (typically less than 1% by weight) of fertilizer to stimulate and enhance the growth of grass. These fertilizers may be selected from a wide variety of fertilizers including slow release fertilizers, lime fertilizers and others. A preferred nutrient for the composition of the present invention has a ratio 1:1:1 of nitrogen:phosphorous:potassium when used with stolons or plugs and 0:1:1 nitrogen:phosphorous:potassium when used with seed. The criteria for selection of fertilizers for growth of various types of turf grass sod are well known in the art.

A preferred composition of soil-less sand based root zone medium of the present invention includes about 20% by weight organic amendment and about 80% by weight said and up to about 1% nutrient. However, root zone medium composition may be varied in accordance with the present invention in order to be more compatible with the root zone profile of the site to which the sod will be transplanted or to meet performance standards required by the specific use of the sod.

The root zone composition of the present invention is useful for growing a wide variety of turf grasses 1 (FIG. 1) beginning from seed, sprigs or plugs. The particular grass selected for growth in the composition of the present invention will depend on the ultimate use of the surface whether it be for use in a stadium, golf course or other use the climate in which it will be used, and other environmental factors.

Another object of the present invention is a method for cultivating, developing and growing all varieties of turf grasses in sod for using the soil-less sand based root zone medium of the present invention. The method of the present invention comprises the selection of the appropriate amount of sand, the appropriate size sand grain so as to be compatible with the root zone profile of the area to which the sod will be transplanted, the selection of an organic amendment, the selection of fertilizer if desired and the selection of turf grass type to meet the specific needs of the end user. These selections will depend on the nature of the root zone on which the sod will be transplanted, the available nutrients, climatic conditions under which the sod will be grown, the percolation rates and water retention characteristics desired and the use to which the sod will be put.

By way of example, in order to produce the soil-less sand based root zone medium of the present invention 3 (FIG. 1), the appropriate amount of sand of the appropriate size, and organic amendments are mixed using general practices in wide spread use in the sod industry. Typically, ingredients can be mixed in a soil blender such as a "Greensmix"® Soil Blender *Waupaca, Wis.). Fertilizers and seeds may also be added at this stage and blended with sand and organic amendment if so desired. Seed is typically added at a rate of 45 lbs/acre. Typical fertilizer for soil growth is 0:1:1 when starting from seed. Upon thorough mixing, the composition is metered out (deposited) to the appropriate depth of from about 0.25 inches to about 1.0 inch on a root impermeable layer 5 (FIG. 1). Metering may be accomplished using machinery such as that described in U.S. Pat. No. 4,232,481, entitled "Carpet of Vegetable Matter" by Michel C. Chamoulaud, which is incorporated herein by reference, or other types of machinery well known in the art. The root impermeable layer 5 may be made of synthetic material such as plastic including polyethylene, rubber, porous polyethylene, other plastics, filter cloth, non-woven materials such as Agryl P-30 or P-50, (Agrifabrics, Atlanta, Ga.) or other root impermeable materials. The root impermeable layer may be perforated to allow drainage of excess moisture. If perforations are used, they must be small enough to prevent roots from penetrating the layer. Upon laying down of the soil-less sand based root zone medium onto the root impermeable layer, seed (if not yet added) stolons, sprigs or plugs are then planted in the medium using standard procedures well known in the sod industry. For example, stolons are typically planted at a rate of 600 bushels per acre. The choice of seed, stolon, sprig or plug will be determined by the type of turf grass desired. By way of non-limiting example, grasses which may be started from stolons, sprigs or plugs include various Bermuda grasses, such as Tifway, Tifway II, Tifgreen, Tifdwarf, Zoysia grasses such as Myers Z-52, Casmere, and grasses such as St. Augustine, and Centipede. By way of non-limiting example, grasses grown from seed include bent grass such as Penncross, Pennlinks, SR1020 and others. Other grasses grown from seed include Fescues, Ryes, Bluegrasses, Zoysias, Buffalo grasses and others. The quantity of plant material used is based on normal sod establishment procedures which are well known in the art. For example, when bent grass sod is desired, seed is usually evenly spread at a rate of about 50 lbs. per acre. Turf grass is then allowed to grow using standard cultivation procedures and which are well known in the art and which include adequate watering and supplemental fertilization if required or desired. Choice of fertilizer will depend on the type of grass used and on other criteria which are well known in the art. Examples of fertilizers useful in the present invention include but are not limited to fertilizers having nitrogen:phosphorous:potassium ratios of 1:0:0, 1:1:1, 2:1:2 and 2:1:3. After planting, the sod mat 7 (FIG. 1) is typically ready for harvest within 10–14 weeks. An important advantage of the method of the present invention is that due to the presence of the root impermeable barrier 5 the root system 3 (FIG. 1) of the sod grows in a horizontal direction and does not require horizontal cutting during harvesting as does conventional sod. The only cutting necessary for harvest is along the edges of the sod to allow the sod to be cut to appropriate size and rolled for transport. Because of the minimal disturbance to the root system, shock is minimized and root zones are established more quickly at the site of use. Sod produced by this method is resistant to compaction, compatible with the root zone profile of the site to which it will be transplanted, has appropriate percolation rates and water retention properties and is well suited for use on sports surfaces including stadium and golf courses.

I claim:

1. A method of preparing a sports surface comprising turf grass by implanting a transportable turf at a sports site, the method comprising the steps of:
   a) laying down a root impermeable barrier at a place other than the sports site;
   b) depositing a layer of a root zone medium sufficient for production of turf grass on top of the root impermeable barrier, said root zone medium comprising:
      1) sand in an amount comprising at least about 60% by weight of the root zone medium;
      2) organic amendment in an amount comprising at most about 40% by weight of the root zone medium; and
      3) an effective amount of fertilizer;
   c) introducing seeds, stolons, sprigs or plugs of the turf grass into the root zone medium;
   d) propagating said seeds, stolons, sprigs or plugs into a transportable turf comprising turf grass sod and the root zone medium;
   e) transporting the transportable turf to the sports site; and
   f) forming the sports surface by planting the transportable turf at the sports site.

2. The method of claim 1, wherein the organic amendment comprises from about 20% to about 30% by weight of the root zone medium.

3. The method of claim 1, wherein the organic amendment comprises Canadian sphagnum peat moss.

4. The sports surface made according to claim 1.

5. The sports surface of claim 4, wherein the sports surface is a stadium field.

6. The sports surface of claim 4, wherein the sports surface is a golf green surface.

7. The sports surface of claim 4, wherein the sports surface is a golf course fairway surface.

8. The method of claim 1, wherein the root impermeable barrier is perforated.

9. A method of preparing a sports surface comprising turf grass for a sports site, the method comprising the steps of:
   a) laying down a root impermeable barrier at a place other than the sports site;
   b) depositing a layer of a root zone medium sufficient for production of turf grass on top of the root impermeable barrier, said root zone medium comprising:
      1) sand in an amount comprising at least about 60% by weight of the root zone medium;
      2) organic amendment in an amount comprising at most about 40% by weight of the root zone medium; and
      3) an effective amount of fertilizer;
   c) introducing seeds, stolons, sprigs or plugs of the turf grass into the root zone medium;
   d) propagating said seeds, stolons, sprigs or plugs into a transportable turf comprising turf grass sod and the root zone medium; and
   e) harvesting the transportable turf without horizontally cutting the transportable turf.

10. The method of claim 9, wherein the organic amendment comprises from about 20% to about 30% by weight of the root zone medium.

11. The method of claim 9, wherein the organic amendment comprises Canadian sphagnum peat moss.

12. The method of claim 9, further comprising the step of:
   f) transporting the transportable turf to the sports site.

13. The method of claim 12, further comprising the step of:
   g) forming the sports surface by planting the transportable turf at the sports site.

14. The sports surface made according to claim 13.

15. The sports surface of claim 14, wherein the sports surface is a stadium field.

16. The sports surface of claim 14, wherein the sports surface is a golf green surface.

17. The sports surface of claim 14, wherein the sports surface is a golf course fairway surface.

18. A method of preparing a sports surface comprising turf grass for a sports site, the method comprising the steps of:
   a) laying down a plastic barrier at a place other than the sports site;
   b) depositing a layer of a root zone medium sufficient for production of turf grass on top of the plastic barrier, said root zone medium comprising:
      1) sand in an amount comprising at least about 60% by weight of the root zone medium;
      2) organic amendment in an amount comprising at most about 40% by weight of the root zone medium; and
      3) an effective amount of fertilizer;
   c) introducing seeds, stolons, sprigs or plugs of the turf grass into the root zone medium;
   d) propagating said seeds, stolons, sprigs or plugs into a transportable turf comprising turf grass sod and the root zone medium; and
   e) transporting the transportable turf to the sports site.

19. The method of claim 18, further comprising the step of harvesting the transportable turf without horizontally cutting the transportable turf.

20. The method of claim 18, wherein the plastic barrier is perforated.

21. The method of claim 18, wherein the plastic barrier is a synthetic material.

22. The method of claim 18, wherein the plastic barrier is polyethylene.

23. The method of claim 18, further comprising the step of:
   f) forming the sports surface by planting the transportable turf at the sports site.

24. The sports surface made according to claim 23.

25. The sports surface of claim 24, wherein the sports surface is a stadium field.

26. The sports surface of claim 24, wherein the sports surface is a golf green surface.

27. The sports surface of claim 24, wherein the sports surface is a golf course fairway surface.

* * * * *